United States Patent [19]

Okada et al.

[11] 3,907,759

[45] Sept. 23, 1975

[54] CATALYST FOR POLYMERIZATION OF OLEFINS AND PROCESS FOR POLYMERIZATION OF OLEFINS WITH USE OF SAID CATALYST

[75] Inventors: Naotake Okada; Kazumi Tsubaki; Hiroshi Morinaga; Takeshi Iwabuchi; Masaru Iida, all of Ichihara; Koichi Taguchi, Kuki, all of Japan

[73] Assignee: Nissan Kagaku Kogyo Kabushiki Kaisha, Tokyo, Japan

[22] Filed: Oct. 3, 1973

[21] Appl. No.: 403,223

[30] Foreign Application Priority Data
Oct. 6, 1972  Japan................................ 47-100465
Apr. 25, 1973  Japan................................ 48-46954

[52] U.S. Cl. ............ 260/88.2; 260/80.78; 260/93.7; 260/94.9 C; 252/424
[51] Int. Cl.$^2$. C08F 4/02; C08F 10/02; C08F 10/08
[58] Field of Search............... 260/93.7, 88.2, 80.78, 260/88.2, 94.9 C; 252/424

[56] References Cited
UNITED STATES PATENTS
3,166,542  1/1965  Orzechowski et al. ............ 260/93.7
3,166,543  1/1965  Orzechowski et al. ............ 260/93.7
3,166,544  1/1965  Orzechowski et al. ............ 260/93.7

FOREIGN PATENTS OR APPLICATIONS
7,040,295  12/1970  Japan 1,140,649  1/1969  United Kingdom OTHER PUBLICATIONS
Kipping and Hackford, J. Chem. Soc., 1911, 99, 138–145.
Sauer, J. Amer. Chem. Soc., 1944, 66, 1707–1710.

*Primary Examiner*—Joseph L. Schofer
*Assistant Examiner*—A. L. Clingman

[57] ABSTRACT

A catalyst for polymerization of olefins comprising a solid catalyst component and an organic metal compound, said solid catalyst component being obtained by reacting a transition metal halogen compound with a reaction product between a Grignard reagent and an organic silicon compound selected from the group consisting of chain or cyclic hydropolysiloxanes having structural units expressed by the formula

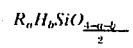

wherein R is a member selected from the group consisting of alkyl groups, aryl groups, aralkyl groups and aryloxy groups, $a$ is an integer of 0, 1 or 2, and $b$ is an integer of 1, 2 or 3 with the proviso that the sum of $a$ and $b$ does not exceed 3,
and organic silicon compounds having in the molecule organic and hydroxyl groups bonded to the silicon atom, and a process for polymerization of olefins with use of such catalyst.

15 Claims, 2 Drawing Figures

CATALYST FOR POLYMERIZATION OF OLEFINS AND PROCESS FOR POLYMERIZATION OF OLEFINS WITH USE OF SAID CATALYST

BACKGROUND OF THE INVENTION

1. Field of the Invention

This invention relates to a novel catalyst for polymerization of olefins and a process for polymerizing olefins, especially ethylene, with use of such novel catalyst.

2. Description of the Prior Art

In 1953 Dr. Karl Ziegler published that olefins can be polymerized under low pressure by a catalyst comprising a halogen compound of a transition metal such as titanium or vanadium and an organic metal compound such as organic aluminium compound or dialkyl zinc, and since then, catalysts of this type have been broadly used as Ziegler catalysts for polymerization of olefins.

Various attempts have been made and proposed to increase the efficiency of utilization of the transition metal halogen compound component in Ziegler type catalysts by reacting a transition metal halogen compound with a powdery solid substance to form a solid catalyst component and incorporating this solid catalyst component with an organic metal compound.

For instance, Belgian Patent No. 650,679 discloses a technique of preparing a solid catalyst component by reacting magnesium hydroxychloride with a transition metal halogen compound. Further, Belgian Patent No. 705,220 teaches a technique of reacting magnesium oxide or magnesium sulfate with a transition metal halogen compound and Japanese Patent Publication No. 40295/1970 discloses a technique of reacting magnesium hydroxide with a transition metal halogen compound. Still further, it has been reported that powders of organic macromolecular substances such as polyolefin, polyamides and polyesters, powders of inorganic oxides such as silica, alumina, titania, zirconia and thoria, and divalent metal compounds such as oxides, hydroxides, sulfates, nitrates, phosphates and silicates of divalent metals, are effective for the preparation of such solid catalyst component.

In general, in order to obtain commercially valuable products with use of Ziegler type catalysts, it is admitted that residual catalyst components should be removed from resulting polymers. In case a polymer is prepared by a combination catalyst of an organic metal compound and a solid catalyst component formed by reacting a transition metal halogen compound with such a powdery solid substance as mentioned above, it is extremely difficult to remove the residual catalyst components from the resulting polymer product, and it is practically impossible to accomplish such removal. Therefore, when a polymer is prepared by employing a catalyst comprising a solid catalyst component of this type, the resulting polymer is, in general, processed directly without removal of residual catalyst components, which not only results in various defects and disadvantages in final products such as coloration and deterioration of molded articles, formation of fish eyes, and yarn breakages and coloration in fibrous articles, but also causes such undesired phenomena in polymer processing machines as rustering and corrosion.

SUMMARY OF THE INVENTION

This invention relates to a novel catalyst for polymerization of olefins and to a process for polymerizing olefins, especially ethylene, with use of this novel catalyst.

It is a primary object of this invention to provide a novel and useful catalyst for polymerization of olefins which has a high activity and is free of defects involved in known conventional Ziegler type catalysts.

Another object of this invention is to provide a catalyst for polymerization of olefins which can give a high yield of a polyolefin per the unit weight of the catalyst and hence, hardly gives any bad influences to the resulting polyolefin even without conducting such costy operation as removal of the residual catalyst and provides a polymer which can be directly processed.

Still another object of this invention is to provide a novel catalyst for polymerization of olefins which is characterized by a very small change of the activity during polymerization and a very high polymerization activity in turn durable for a long time and thereby to make it possible to conduct the polymerization continuously under stable conditions, and further characterized in that various grades products having a desired molecular weight can be provided because it is so sensitive to an action of a molecular weight-adjusting agent such as hydrogen that the molecular weight can be easily controlled with use of a small amount of such molecular weight-adjusting agent.

A further object of this invention is to provide a novel polymerization catalyst which can give a powdery polymer having a high bulk density and a substantially spherical form, with the result the obtained polymer slurry or a polymer powder obtained by drying such slurry has a good flowability and hence, does not cause such operational troubles as clogging of transportation equipment or the like.

A still further object of this invention is to provide an excellent polymerization catalyst, characterized in that in the preparation of which a component to be reacted with a transition metal halogen compound can be used in the form of a solution in an inert aromatic hydrocarbon solvent, for example, benzene, toluene and xylene and therefore, it is unnecessary to conduct an operation of adjusting the size of the starting materials of the catalyst, such as pulverization and sieving.

We have found that when a solid catalyst component is prepared by reacting a transition metal halogen compound with a reaction product between an organic silicon compound and a Grignard reagent and this solid catalyst component is mixed with an organic metal compound, a catalyst having a very high activity of polymerizing olefins can be obtained.

In the instant specification and claims, the organic silicon compound includes (I) a chain or cyclic hydropolysiloxane having structural units expressed by the following general formula:

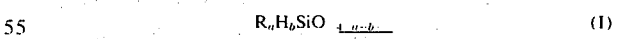

(I)

wherein R is a member selected from the group consisting of alkyl groups, aryl groups, aralkyl groups and aryloxy groups, and $a$ is 0, 1 or 2 and $b$ is 1, 2 or 3 with the proviso that the sum of $a$ and $b$ does not exceed 3, and (II) an organic silicon compound having in the molecule organic and hydroxy groups bonded to the silicon atom.

The degree of polymerization is not particularly critical in the hydropolysiloxane represented by the general formula (I), and any kind of hydropolysiloxanes from liquid low degree polymerized one to greasy and waxy hydropolysiloxanes having a high degree of polymerization as corresponding to a viscosity of 100,000 centistrokes as measured at 25°C., and further solid hydropolysiloxanes can be used in this invention. Since the activity of the catalyst is not so influenced by the structure of the terminal group of such hydropolysiloxane, it may be capped with an optional inert group such as a trialkylsilyl group.

The hydropolysiloxane of the formula (I) to be generally used in this invention includes, for example, tetramethyldisiloxane, diphenyldisiloxane, trimethylcyclotrisiloxane, tetramethylcyclotetrasiloxane, methylhydropolysiloxane, phenylhydropolysiloxane, ethoxyhydropolysiloxane and chlorophenylhydropolysiloxane.

One of the organic silicon compound having in the molecule organic and hydroxyl groups bonded to the silicon atom, can be mentioned a silane type compound represented by the following formula (III)

(III)

wherein R' is a monovalent hydrocarbon residue having 1 to 18 carbon atoms, such as an alkyl, cycloalkyl, aralkyl, aryl or alkaryl group which may be straight or branches and saturated or unsaturated and may have a cyclic structure, and $n$ is an integer of 1, 2 or 3 with the proviso that when a plurality of groups R' are present, they may be the same or different.

To cite examples of the silane type compound of the formula (III) in which $n$ is 3, it includes trimethylhydroxysilane, triethylhydroxysilane, triphenylhydroxysilane, methyldiphenylhydroxysilane and benzyldiphenylhydroxysilane. The compound of the formula (III) in which $n$ is 2 includes diethyldihydroxysilane, dipropyldihydroxysilane, diallyldihydroxysilane, dicyclohexyldihydroxysilane and diphenyldihydroxysilane. The compound of the formula (III) in which $n$ is 1, includes butyltrihydroxysilane and phenyltrihydroxysilane.

Another organic silicon compounds having in the molecule organic and hydroxyl groups bonded to the silicon atom are straight, branched and cross-linked polysiloxane compounds having siloxane linkage ( Si—O—Si ) in the molecule chain, which can be regarded as condensates of silane type compounds of the formula (III), $R'_n Si(OH)_{4-n}$. The condensate of this type includes various polysiloxane type compounds, which are divided into two groups, condensates of one silane type compound and condensates of two or more silane type compounds, depending on the kind and number of the monovalent hydrocarbon residue R'. According to this invention, any of condensates of these two groups can be employed.

The degree of polymerization is not particularly critical in this polysiloxane type compound. For instance, any polysiloxanes from liquid one having a low degree of polymerization corresponding to the viscosity of few centistrokes as measured at 25°C., to greasy and waxy polysiloxanes having a viscosity of up to 100,000 centistrokes as measured at 25°C., and completely solid polysiloxanes can be used in this invention.

It is sufficient that the number of the hydroxyl group contained in this polysiloxane type compound is at least one per molecule, but a polysiloxane in which the number of the hydroxyl group is too small is not preferred from the practical viewpoint. Accordingly, it is preferred that the content of the hydroxyl group in the polysiloxane type compound is at least 0.1% by weight.

The specific examples of the polysiloxane type compound includes α,ω-dihydroxydimethylpolysiloxanes expressed by the formula, $HO[(Si(CH_3)_2O]_n H$ in which $n$ is an integer of at least 2, and α,ω-dihydroxymethylphenylpolysiloxanes expressed by the formula $HO[-Si(CH_3)_2(C_6H_5)O]_n H$ in which $n$ is an integer of at least 2.

Various organic silicon compounds described above can be used singly or in the form of admixtures of two or more of them, and it is not absolutely indispensable to be pure.

According to this invention, an organic silicon compound mentioned above is reacted with a Grignard reagent, and the resulting reaction product is further reacted with a transition metal halogen compound to form a solid catalyst component.

The Grignard reagent includes organic magnesium halides of the general formula RMgX in which R stands for a hydrocarbon group and X designates a halogen atom, which can be prepared by reacting an organic halogen compound with metallic magnesium, and etherified products of such organic magnesium halides. Accordingly, the Grignard reagent in this invention includes Grignard reagents synthesized in an inert solvent, e.g., a hydrocarbon, such as dihydrocarbyl magnesium expressed by the formula $MgR_2$ and organic magnesium compounds expressed by the formula $(MgR_2)_x \cdot (RMgX)_y$ in which the sum of $x$ and $y$ is 1.

Synthesis of Grignard reagents are disclosed in various literatures and patent specifications. The Grignard reagent to be used in this invention can be synthesized by an optional method selected among these known methods. In the synthesis of the Grignard reagent, it is possible to employ an ether type solvent such as diethyl ether, dibutyl ether and tetrahydrofuran and a hydrocarbon solvent such as heptane, octane, benzene and toluene. In case a hydrocarbon solvent is employed, it is permissible to use a suitable amount of a complexing agent such as ether and amine in combination with the hydrocarbon solvent.

Reaction between the above-mentioned organic silicon compound and Grignard reagent can be performed by an optional method.

For instance, reaction between the hydropolysiloxane and Grignard reagent can be accomplished by adding a hydropolysiloxane little by little under agitation to a Grignard reagent synthesized in a suitable solvent and then allowing the mixture to stand still for a certain period of time. Further, it is also possible to adopt a method comprising dispersing metallic magnesium in a suitable solvent, adding an organic halogen compound and a hydropolysiloxane dropwise over predetermined period to the above dispersion under agitation, and reacting them for predetermined period of time.

The reaction between the hydropolysiloxane and Grignard reagent advances even at room temperature with violet heat generation, but in order to complete the reaction, it is preferred that the reaction mixture is further heated at 50° to 100°C. for 1 to 5 hours. It is also preferred that the hydropolysiloxane and Grignard reagents are fed to a reaction vessel in such amounts that the ratio of MgR:Si:OH is within a range of from 0.05:1 to 1:1.

The so obtained reaction product is subjected to reaction with a transition metal halogen compound as it is or after volatile components such as the solvent used have been removed therefrom. It is also possible to employ this reaction product in the form of a solution in an aromatic hydrocarbon.

BRIEF DESCRIPTION OF THE DRAWING

The infrared absorption spectrum of the so obtained reaction product between the organic silicon compound and Grignard reagent is as shown in FIG. 2. In FIG. 2 there is illustrated an infrared absorption spectrum of a reaction product obtained by reacting methylhydropolysiloxane with a Grignard reagent which is a solution of n-butyl magnesium tetrachloride in tetrahydrofuran (Si/Mg=1), under conditions described in Example 1 given hereinafter. FIG. 1 illustrates an infrared absorption spectrum of methylhydropolysiloxane. In the spectrum of the reaction product, the peak of the characteristic absorption of the siloxane linkage (Si—O—Si) at 1045 cm$^{-1}$ and 1100 cm$^{-1}$ substantially disappear, and the ratio of the intensity between the Si—H absorption at 2170 cm$^{-1}$ and the Si—CH$_3$ absorption at 1250 cm$^{-1}$ in FIG. 1 is substantially identical with the ratio of the intensity between the Si—H absorption at 2100 cm$^{-1}$ and the Si—CH$_3$ absorption at 1250 cm$^{-1}$ in FIG. 2. In view of the foregoing, it will readily be understood that the Si—H linkage of the starting methylhydropolysiloxane can be substantially retained in the reaction product. When according to the method of Gilman et al. (J. Am.Chem. Soc., 47, 2002 (1925)) it was examined whether n-butyl magnesium chloride was present in the reaction product, it was found that such compound was not present at all. From the foregoing facts, it is considered that the reaction between methyl hydropolysiloxane and a Grignard reagent advances according to the following formula

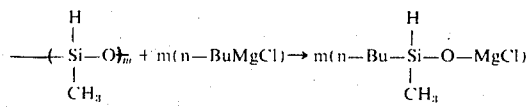

Figure 1:
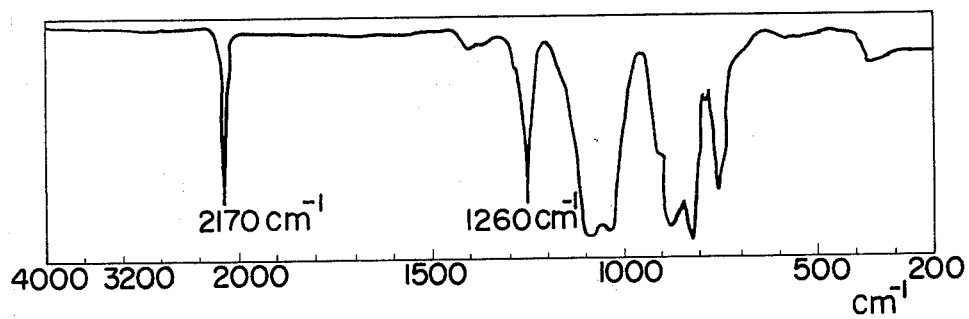
FIG. 1 illustrates an infrared absorption spectrum of methyl hydropolysiloxane which is one of organic silicon compounds to be used in this invention.
Figure 2:
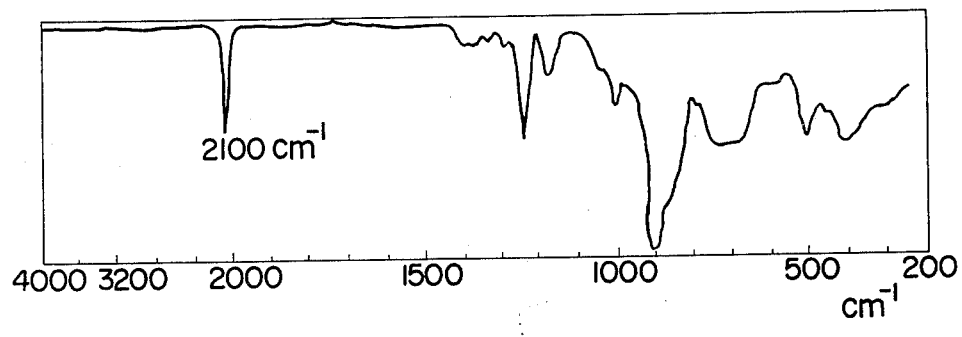
FIG. 2 illustrates an infrared absorption spectrum of a reaction product between the methyl hydropolysiloxane and a Grignard reagent.

This reaction is similar to the reaction of forming a trialkyl silanol from a dialkylpolysiloxane and a Grignard reagent, which was published by Kipping et al. (J. Chem. Soc., 99, 138 (1911)), but the reaction of this invention between methyl hydropolysiloxane and Grignard reagent is characterized in that it advances very easily and promptly under milder conditions than those adopted in the reaction of Kipping et al. Therefore, we admitted that either the above reaction or the resulting reaction product has heretofore been unknown.

In case the reaction between the hydropolysiloxane and Grignard reagent is conducted in a solvent such as diethyl ether, dibutyl ether or tetrahydrofuran, it is very difficult to remove the solvent completely from the reaction product, and in many cases, there is obtained a product in which the solvent molecule is co-ordinated with the magnesium atom in an amount of 0.05 to 1.5 moles per magnesium atom. This reaction product between the Grignard reagent and hydropolysiloxane is insoluble in dibutyl ether, diethyl ether, n-heptane and n-hexane, but it is soluble in tetrahydrofuran, toluene and benzene. Accordingly, when a suitable solvent is chosen for the reaction between this reaction product and a transition metal halogen compound, in this reaction the above reaction product can be used either in the state dissolved in the solvent or in the state suspended in the solvent.

The reaction between a hydroxyl group-containing organic silicon compound (II) and a Grignard reagent can be accomplished by an optional method such as mentioned below. More specifically, it is possible to adopt a method comprising dissolving a Grignard reagent synthesized in a suitable solvent little by little in an organic silicon compound (II) under agitation in an inert gas atmosphere and continuing agitation for a certain period of time after completion of the addition of the total amount of the Grignard reagent to complete the reaction. In this method, the organic silicon compound (II) can be used as it is or after it has been diluted with a solvent such as a hydrocarbon solvent. In the latter case, the reaction can sometimes be performed conveniently.

This reaction can be conducted at a temperature of from −50° to 100°C., but better results are obtained by conducting the reaction at a temperature exceeding room temperature. The reaction will finish for from 30 minutes to 5 hours.

It is desired that the reactants are fed to a reaction vessel in such amounts that the ratio between the magnesium-hydrocarbon linkage (Mg—R) and the hydroxyl group (OH) of the organic silicon compound (II), namely the ratio of OH:MgR, is within a range of from 1:0.05 to 1:1. As far as the OH:MgR ratio is maintained within this range, any mixing ratio of these reactants can be chosen.

The obtained reaction product can be used for reacting with a transition metal halogen compound as it is. However, if this reaction product contained a lot of an ether generally used as the solvent for the organic magnesium compound, the presence of such solvent has undesired influences on the quality of the solid catalyst component formed by the reaction between this reaction product and a transition metal halogen compound. Therefore, it is desired that a part or all of the solvent is removed from the reaction product, and then dissolved or suspended again in an inert hydrocarbon solvent in order to use for reaction with a transition metal halogen compound, and such procedures are generally preferable.

P. O. Sauer disclosed a study on synthesis of trimethylsiloxy magnesium iodide by reaction between trimethylsilanol and methyl magnesium iodide and the structure of the reaction product in J. Amer. Chem. Soc. 1944 66; 1707-1710. It is believed that a similar siloxy magnesium compound is formed according to a similar reaction to the reaction disclosed by R. O. Sauer.

In this invention, this reaction product of a organic silicon compound and Grignard reagent is subjected to reaction with a transition metal halogen compound to form a solid catalyst component.

Any of transition metals proposed by Ziegler can be used, but especially good results are obtained by the use of titanium and vanadium.

The halogen compound of titanium, which can be employed are represented by the following general formula:

$$TiX_n(OR)_{4-n}$$

wherein X stands for a halogen atom, R designates a hydrocarbon group having 1 to 8 carbon atoms, and n is an integer of 1, 2, 3 or 4. Specific examples of such titanium halogen compound are $TiCl_4$, $TiBr_4$, $Ti(OC_2H_5)Cl_3$, $Ti(OC_4H_9)Cl_3$, $Ti(OC_2H_5)_2Cl_2$, $Ti(OC_3H_7)_2Cl_2$ and $Ti(OC_4H_9)_2Cl_2$. The halogen compound of vanadium, which can be used are, for example, $VCl_4$ and $VOCl_3$.

Reaction between the transition metal halogen compound and the reaction product formed from the organic silicon compound and Grignard reagent can be conducted in the presence or absence of an inert hydrocarbon solvent. However, as pointed above, it is preferred that the reaction is conducted in the presence of an inert solvent.

Both reactants can be reacted at any ratio, but it is generally preferred that the transition metal halogen compound is employed in an amount of 0.1 to 50 moles per mole of Mg contained in the reaction product of the organic silicon compound and Grignard reagent. It is also preferred that the reaction is carried out at a temperature of 0° to 150°C. for 5 minutes to 20 hours.

When the transition metal halogen compound is reacted with the reaction product of the organic silicon compound and Grignard reagent, a solid compound is precipitated. This solid compound is separated and washed with an inert solvent such as hexane, heptane and kerosene to remove free soluble components from the solid reaction product. Thus is obtained the intended solid catalyst component to be combined with an organic metal compound. This solid catalyst component may be employed in the as-washed state, namely in the state dispersed in the washing solvent, or it is possible to evaporate the washing solvent under reduced pressure and employ the solid catalyst component in the dry state.

The content of the transition metal halogen compound in the so obtained solid catalyst component can be optionally adjusted by controlling the reaction conditions, namely the reaction temperature and time, the presence or absence of a solvent and the like.

In general, it is preferred that 1 to 200 mg of the transition metal atom is contained per g of the solid catalyst component. When the transition metal content is maintained within this range, the resulting catalysts has an extremely high activity.

It has been found that the atomic valency of titanium or vanadium in the so obtained solid catalyst component varies depending on the kind of the organic silicon compound used.

More specifically, when a hydroxypolysiloxane of the formula (I) is reacted with a Grignard reagent and the resulting reaction product is reacted with a transition metal halogen compound, the transition metal compound is present in the partially reduced state. Namely, in the case of the titanium compound, for instance, 3 to 90% of titanium takes a trivalent form and the remainder is kept in the tetravalent state.

In contrast, when a hydroxyl group-containing organic silicon compound (II) is reacted with a Grignard reagent and the resulting reaction product is reacted with a transition metal halogen compound, the transition metal is not reduced but retains the tetravalent form.

In this invention, the so obtained solid catalyst component is mixed with an organic metal compound and the resulting mixture is employed as a polymerization catalyst.

Any of organic metal compounds used customarily in Ziegler type polymerization catalysts can be used in this invention.

Organic metal compounds that are preferably used in this invention include organoaluminum compounds represented by the following general formula:

$$AlR_nX_{3-n}$$

wherein R stands for a hydrocarbon group having 1 to 8 carbon atoms, X designates a halogen or hydrogen atom or an alkoxy group, and n is an integer of from 1 to 3, and organozinc compounds represented by the following general formula:

$$ZnR'_2$$

wherein R' represents an alkyl group having 1 to 8 carbon atoms.

Examples of such organoaluminum compound are trimethyl aluminum, triethyl aluminum, tributyl aluminum, diethyl aluminum monochloride, dibutyl aluminum monochloride, ethyl aluminium sesquichloride, diethyl aluminum hydride, dibutyl aluminum hydride and diethyl aluminum ethoxide.

Examples of the organic zinc compound are diethyl zinc and dibutyl zinc et al.

When the above-mentioned solid catalyst component is mixed with an organic metal compound such as mentioned above, a catalyst for polymerization of olefins can be obtained. For polymerization both the components can be fed separately in a polymerization vessel and then an olefin is fed in the reaction vessel containing the catalyst formed as a result of the reaction. Further, it is possible to prepare in advance a catalyst suspension by reacting both the components in an inert solvent and feed this suspension to a polymerization vessel for use in polymerization of olefins.

A ratio of both the components suitable for formation of a preferably catalyst for polymerization of olefins is such that the amount of the aluminum and/or zinc atom is 1 to 1000 moles per mole of the transition metal atom in the catalyst.

Polymerization conditions to be adopted for polymerizing olefins with use of the catalyst of this invention are substantially identical with well-known polymerization conditions customarily adopted wherein Ziegler type catalysts are employed.

More specifically, the catalyst of this invention is dispersed in a suitable inert hydrocarbon solvent such as hexane, heptane and kerosene and an olefin is fed in this dispersion and polymerized. It is preferred that the polymerization is conducted at a temperature of 30° to 200°C., especially 60° to 100°C., and under a pressure ranging from atmospheric pressure to 50 Kg/cm².

It is also preferred that the catalyst is used in such an amount that the amount of the organic metal compound component is 0.1 to 50 millimoles, especially 0.3 to 10 millimoles, per liter of the solvent used.

In polymerizing olefins with use of the catalyst of this invention, the molecular weight can be easily controlled in the resulting polymers by adjusting the polymerization temperature, the amount of the catalyst and other factors, but the adjustment of the molecular weight can be accomplished most effectively by adding hydrogen to the polymerization system.

The catalyst of this invention can be used for polymerization of any olefins, but the catalyst of this invention is especially useful for homopolymerization of ethylene and copolymerization of ethylene with up to about 10% of other α-olefin such as propylene, butene-1 and hexane and thus highly crystalline polyolefins can be obtained.

The catalyst of this invention has an extremely high activity, and hence, the amount of the catalyst left in a polymer formed with use of this catalyst is very small. Therefore, any bad influences to the resulting polymer by the residual catalyst can be avoided, and even if the asprepared polymer is directly processed without removal of the residual catalyst, a shaped article having an excellent color and a high strength can be obtained. This is one of advantages attained by this invention.

Further, since the catalyst of this invention is very sensitive to hydrogen and other molecular weight-adjusting agent, the molecular weight of the polymer can easily be controlled and products of various grades of a broad range can be provided. Still further, the polymer formed with use of the catalyst of this invention has a high bulk density and takes a spherical form. Therefore, the polymer slurry and the dried polymer have a high flowability and does not cause such troubles as clogging of transportation equipment or the like, with the result that the polymerization process can be conducted very stably.

As is seen from the results of Examples given hereinafter, the molecular structure of the polymer formed with use of the catalyst of this invention is characterized by a high chain propagation degree (the number of methyl groups per 1000 carbon atoms) and extremely low content of unsaturated bonds in the polymer formed with use of the catalyst of this invention. Therefore, the polymer exhibits a very high stability to heat and light. Moreover, the polymer has a very excellent moldability.

As pointed above, the reaction product between the organic silicon compound and Grignard reagent to be used for formation of the catalyst of this invention is soluble in an aromatic hydrocarbon, and therefore, it is possible to react the above reaction product in the form of a solution in such solvent with a transition metal halogen compound, with the result that as regards the preparation of the catalyst and the quality of the resulting polymer, this invention attains various great advantages over the conventional techniques using solvent-insoluble solid components.

DESCRIPTION OF THE PREFERRED EMBODIMENTS

This invention will now be illustrated more detailedly by reference to Examples.

EXAMPLE 1 a. Preparation of Reaction Product of Hydropolysiloxane and Grignard Reagent

A glass reaction vessel, which had been sufficiently dried and the atmosphere of which had been replaced by nitrogen, was charged with 75 ml of a tetrahydrofuran solution containing 0.167 mole of n-butyl magnesium chloride, and 10.5 ml (0.175 mole calculated as Si) of trimethylsilyl group-capped methylhydropolysiloxane having a viscosity of about 30 centistrokes as measured at 25°C. was gradually added dropwise to the tetrahydrofuran solution under agitation. Since heat was generated, the reaction vessel was cooled by a cooling medium so that the inside temperature did not exceed 70°C. After completion of the dropwise addition, the mixture was maintained at 70°C. for 1 hour, and then it was cooled to room temperature to obtain a dark brown, transparent solution. A part of this solution was sampled and according to the method of Gilman et al. it was examined whether the unreacted n-butyl magnesium chloride was present or not. As a result, it was found that no unreacted n-butyl magnesium chloride was present. The solvent was distilled off under reduced pressure from this solution while maintained it at 70°C. As a result, 37.5 g of a white solid reaction product was obtained. The amount of tetrahydrofuran contained in this white solid substance was 0.41 mole per atom of Mg. (The amount of the tetrahydrofuran was determined by gas chromatography after the hydrolysis of the reaction product.) In an infrared absorption spectrum of a toluene solution of this white solid, the absorption peaks of the Si—O—Si linkage of methylhydroxypolysiloxane (at 1045 and 1100 cm$^{-1}$) substantially disappeared.

b. Preparation of Solid Catalyst Component

A glass reaction vessel, which had been sufficiently dried and the atmosphere of which had been replaced by nitrogen, was charged with 8.7 g of the white solid reaction product (a) obtained as disclosed in (a) above, and it was dissolved in 20 ml of toluene. At room temperature 50 ml of n-heptane and 20 ml of TiCl$_4$ were added to the solution and the reaction was conducted at 100°C. for 30 minutes. After completion of the reaction, the solid phase was separated and decanted 5 times with use of 600 ml of n-hexane, followed by drying under reduced pressure at 50°C. As a result, 8.8 g of a gray solid catalyst component (A) was obtained. The titanium content was 105 mg per g of this solid catalyst component, and 78% of titanium was in the trivalent state and the remainder was in the tetravalent state.

c. Polymerization

A 1.2-liter inner capacity stainless steel autoclave equipped with a stirrer and a jacket for heating and cooling, which had been dried and the inside atmosphere of which had been replaced by nitrogen, was charged with 600 ml of n-hexane and the temperature was elevated to 60°C. by heating. Then, 2.5 millimoles of tri-isobutyl aluminum and 3 mg of the solid catalyst component obtained as disclosed in (b) above were added successively to the charge of the autoclave. Then, hydrogen was introduced under a pressure of 3 Kg/cm$^2$ and the temperature was elevated to 85°C., following which ethylene was continuously fed so that the total pressure was 9 Kg/cm$^2$ and polymerization was conducted in this state for 1 hour. The reaction mixture was cooled, and the resulting polymer was separated by means of a glass filter and dried under reduced pressure at 60°C. for 5 hours to obtain 143 g of white powdery polyethylene having a density of 0.9610. This polyethylene had MI$_2$ of 2.9 g/10 min.

The activity of the catalyst in this polymerization corresponded to 454 Kg PE/g of Ti/hr and 47.8 Kg PE/g of catalyst/hr. (The unit of Kg PE/g of Ti/hr is for a yield of polyethylene per gram of the titanium atom per hour and the unit of Kg PE/g of catalyst/hr is for a yield of polyethylene per gram of solid catalyst component (A) per hour; the activity of the catalyst is expressed in this manner based on the polymer yield in Examples given hereinafter.)

Physical properties of the polyethylene were determined according to the following methods.

MI$_2$ : melt index as measured at 190°C. under a load of 2.16 Kg according to the method of ASTM-D-1238-57T.

Bulk density: measured according to the method of JIS K 6721-1966.

Numbers of methyl group and unsaturated double bond: determined from the infrared absorption spectrum according to the method disclosed in J. Polymer Sci., Bl, 371 (1963).

EXAMPLE 2

With use of 3 mg of the solid catalyst component (A) obtained in (b) of Example 1, polymerization was conducted under the same conditions as in Example 1 except that the pressure of hydrogen was reduced to 2 Kg/cm$^2$ and the amount of tri-isobutyl aluminum was reduced to 0.5 millimole. Thus 168 g of a white polyethylene powder having a density of 0.9591 was obtained. This polyethylene was characterized by MI$_2$ of 0.83 g/10 min, numbers of the methyl group and unsaturated double bond per 1,000 carbon atoms of 2.2 and 0.09, respectively, and a bulk density of 0.231 g/cm$^3$. The activity of the catalyst corresponded to 534 Kg PE/g of Ti/hr and 56 Kg PE/g of catalyst/hr. The titanium content in the polyethylene was 2.0 ppm (as measured according to the fluorescent X-ray method) and the ash content was 56 ppm (as measured according to the ashing method).

EXAMPLE 3

With use of 3 mg of the solid catalyst component (A) obtained in (b) of Example 1, polymerization was carried out under the same conditions as shown in (c) of Example 1 except that 1.0 millimole of triethyl aluminum was employed instead of the tri-isobutyl aluminum. 95g of a white polyethylene powder having MI$_2$ of 3.1 g/10 min and a bulk density of 0.270 g/cm$^3$ was obtained. The activity of the catalyst corresponded to 302 Kg/PE/g of Ti/hr and 31.6 Kg PE/g of catalyst/hr.

EXAMPLE 4

With use of 3 mg of the solid catalyst component obtained in Example 1, polymerization was carried out under the same conditions as in Example 1 except that 2.5 millimoles of diethyl aluminum monochloride was used instead of the tri-isobutyl aluminum, 52 g of a white polyethylene powder having MI$_2$ of 0.04 g/10 min and a bulk density of 0.289 g/cm$^3$ was obtained. The activity of the catalyst corresponded to 165 Kg PE/g of Ti/hr and 17.3 Kg/g of catalyst/hr.

EXAMPLE 5 a. Preparation of Reaction Product of Hydropolysiloxane and Grignard Reagent

A glass reaction vessel, which had been sufficiently dried and the inside atmosphere of which had been replaced by nitrogen, was charged with 50 ml of a diethyl ether solution containing 0.145 mole of n-butyl magnesium chloride, and a liquid mixture of 9.7 ml (0.161 mole as Si) of trimethylsilyl group-capped methylhydropolysiloxane and 90 ml of n-heptane was added dropwise under agitation. Since heat was generated, the dropwise addition was conducted so that the solvent was refluxed gradually. Then, the reaction was conducted at 60°C. for 1 hour to obtain a white slurry. A part of the solvent (diethyl ether and n-heptane) was removed from the white slurry by distillation to obtain 100 ml of a viscous, white, slurry-like reaction product.

b. Preparation of Solid Catalyst Component

A glass reaction vessel, which had been sufficiently dried and the inside atmosphere of which had been replaced by nitrogen, was charged with 30 ml of the reaction product obtained in (a) above, and 50 ml of n-heptane and 20 ml of TiCl$_4$ were added at room temperature to the above reaction product. The reaction was conducted at 100°C. for 30 minutes. The resulting reddish brown solid phase was decanted and washed 5 times with 600 ml of n-hexane to obtain slurry of a solid catalyst component (A) in n-hexane.

c. Polymerization

With use of the slurry of the above solid catalyst component (A) in n-hexane in an amount of 0.0065 millimole as Ti, polymerization was carried out under the same conditions as in (c) of Example 1 except that tri-isobutyl aluminum was used in an amount of 0.5 millimole. Thus 74 g of a white polyethylene powder having MI$_2$ of 0.43 g/10 min and a bulk density of 0.241 g/cm$^3$ was obtained. The activity of the catalyst corresponded to 237 Kg PE/g of Ti/hr.

EXAMPLE 6 b. Preparation of Solid Catalyst Component

A glass reaction vessel, which had been sufficiently dried and the inside atmosphere of which had been replaced by nitrogen, was charged with 30 ml of n-heptane, and 5.6 g of Ti(O—n—C$_4$H$_9$)Cl$_3$ was added thereto. The mixture was heated at 50°C. to form a homogeneous solution. Then, 15 ml of the viscous white slurry of the reaction product obtained in (a) of Example 5 was added to the solution, and the reaction was carried out at 70°C. for 1 hour.

The resulting solid phase was decanted and washed 5 times with 300 ml of n-hexane to obtain a slurry of a solid catalyst component (A) in n-hexane.

c. Polymerization

When polymerization was carried out under the same conditions as in (c) of Example 1 except that the above n-hexane slurry of the above solid catalyst component was used in an amount of 0.03 millimole as Ti. There was obtained 157 g of a white polyethylene powder having MI$_2$ of 5.2 g/10 min and a bulk density of 0.280 g/cm$^3$. The activity of the catalyst corresponded to 109 Kg/PE/g of Ti/hr.

EXAMPLE 7 a. Preparation of Reaction Product of Hydropolysiloxane and Grignard Reagent

Procedures of (a) in Example 1 were repeated in the same manner except that 50 ml of a tetrahydrofuran solution containing 0.115 mole of n-propyl magnesium chloride and 7.5 ml of trimethylsilyl group-capped methylhydropolysiloxane were employed. 23.3 g of a white solid reaction product was obtained. The amount of tetrahydrofuran contained in this white solid was 0.49 mole per atom of Mg.

b. Preparation of Solid Catalyst Component

A glass reaction vessel, which had been sufficiently dried and the inside atmosphere of which had been replaced by nitrogen, was charged with 3.0 g of the above white solid and it was dissolved in 30 ml of toluene. Then, 10 ml of TiCl$_4$ was added to the solution at room temperature, and the reaction was conducted at 100°C. for 30 minutes. The solid phase was decanted and washed 5 times with 500 ml of n-hexane to obtain a slurry of a solid catalyst component in n-hexane.

c. Polymerization

Polymerization was carried out under the same conditions as in Example 1 except that the above n-hexane slurry of the solid catalyst component was used in an amount of 0.0065 millimole as Ti. 147 of a white polyethylene powder having MI$_2$ of 1.9 g/10 min and a bulk density of 0.258 g/cm$^3$ was obtained. The activity of the catalyst corresponded to 474 Kg PE/g of Ti/hr.

EXAMPLE 8 a. Preparation of Reaction Product of Hydropolysiloxane and Grignard Reagent

In the same manner as described in (a) of Example 1 a tetrahydrofuran solution of n-butyl magnesium chloride was reacted with methylhydropolysiloxane to obtain a dark brown transparent solution. To this solution was added 100 ml of toluene, and a part of the solvent (toluene and tetrahydrofuran) was removed by distillation under reduced pressure to obtain 80 ml of a dark brown transparent solution of a reaction product. In this toluene solution of the reaction product, tetrahydrofuran was present in an amount of 0.6 mole per atom of Mg.

b. Preparation of Solid Catalyst Component

A glass reaction vessel, which had been sufficiently dried and the inside atmosphere of which had been replaced by nitrogen, was charged with 50 ml of n-heptane and 40 ml of Ti(O—n—C$_4$H$_9$)$_2$Cl$_2$, and 20 ml of the toluene solution of the reaction product obtained in (a) above was added to the charge of the reaction vessel under agitation at room temperature. The reaction was conducted at 100°C. for 30 minutes and the resulting solid phase was decanted and washed 5 time with 1 liter of n-hexane to obtain a slurry of a solid catalyst component in n-hexane.

c. Polymerization

Polymerization was carried out under the same conditions as in Example 1 except that the above n-hexane slurry of the solid catalyst component was used in an amount of 0.03 millimole at Ti. 79 g of a white polyethylene powder having MI$_2$ of 1.25 g/10 min and a bulk density of 0.223 g/cm$^3$ was obtained. The activity of the catalyst corresponded to 55 Kg PE/g of Ti/hr.

EXAMPLE 9 b. Preparation of Solid Catalyst Component

A glass reaction vessel, which had been sufficiently dried and the inside atmosphere of which had been replaced by nitrogen, was charged with 30 ml of toluene and 5 ml of Ti(O—n—C$_4$H$_9$)$_2$Cl$_2$, and 10 ml of the toluene solution of the reaction product obtained in (a) of Example 7 was added thereto at room temperature. The reaction was conducted at 100°C. for 30 minutes, and the resulting solid phase was decanted 5 times with 500 ml of n-hexane to obtain a slurry of a solid catalyst component in n-hexane.

c. Polymerization

Polymerization was carried out under the same conditions as in (c) of Example 1 except that the above n-hexane slurry of the solid reaction product was used in an amount of 0.03 millimole as Ti. 146 g of a white polyethylene powder having MI$_2$ of 2.5 g/10 min and a bulk density of 0.305 g/cm$^3$ was obtained. The activity of the catalyst corresponded to 101 Kg PE/g of Ti/hr.

EXAMPLE 10 b. Preparation of Solid Catalyst Component

A glass reaction vessel, which had been sufficiently dried and the inside atmosphere of which had been replaced by nitrogen, was charged with 250 ml of n-heptane and 80 ml of the toluene solution of the reaction product obtained under the same conditions as in (a) of Example 8 to form a white slurry. Then, 80 ml of TiCl$_4$ was added dropwise to the white slurry at room temperature, and the reaction was conducted at 100°C. for 30 minutes. The reaction mixture was cooled and the resulting solid phase was decanted and washed 5 times with 2.5 liter of n-hexane to obtain 3 liter of a slurry of a solid catalyst component in n-hexane, in which the concentration of the solid catalyst component was 11.5 g/l and the titanium atom concentration was 1.41 g/l.

c. Polymerization

Polymerization was carried out under the same conditions as in (c) of Example 1 except that 0.22 ml of the above n-hexane slurry of the solid catalyst component and 0.5 millimole of tri-isobutyl aluminum were employed. 128 g of a white polyethylene powder having MI$_2$ of 2.3 g/10 min and a bulk density of 0.260 g/cm$^3$ was obtained. The activity of the catalyst corresponded to 413 Kg PE/g of Ti/hr and 50.6 Kg PE/g of catalyst/hr.

EXAMPLE 11 c. Polymerization

Polymerization was carried out under the same conditions as in Example 1 except that 0.15 ml of the n-hexane slurry of the solid catalyst component obtained in (b) of Example 10 was employed and the polymerization time was charged to 3 hours, 147 g of a white polyethylene powder having MI$_2$ of 1.46 g/10 min and a bulk density of 0.310 g/cm$^3$ was obtained. The activity of the catalyst corresponded to 231 Kg PE/g of Ti/hr and 28.5 Kg PE/g of catalyst/hr.

EXAMPLE 12 c. Polymerization

Polymerization was carried out under the same conditions as in (c) of Example 1 except that 0.22 ml of the n-hexane slurry of the solid catalyst component obtained in (b) of Example 10 was employed, tri-isobutyl aluminum was employed in an amount of 1.0 millimole and 2 g of butene-1 was charged in the polymerization vessel prior to the polymerization. 118 g of a white polyethylene powder having density of 0.9535, MI$_2$ of 3.5 g/10 min and a bulk density of 0.288 g/cm$^3$ was obtained. The activity of the catalyst corresponded to 381 Kg PE/g of Ti/hr and 46.7 Kg PE/g of catalyst/hr.

EXAMPLE 13 a. Preparation of Reaction Product

A flask equipped with a condenser, a thermometer, a dropping funnel and a stirrer was dried and the inside atmosphere was replaced by nitrogen. Then, 54 ml of α,ω-dihydroxydimethylpolysiloxane having a degree of polymerization of 9 (the SiOH content being 146 millimoles) and 100 ml of toluene were thrown into the flask. Then, 57 ml (146 millimoles) of n-butyl magnesium chloride, synthesized in tetrahydrofuran, was added little by little to the charge of the flask from the dropping funnel at room temperature under agitation. The total amount of n-butyl magnesium chloride was added over a period of 1 hour. Then, agitation was continued for 1 hour to obtain a slightly opaque solution. A part of the solution was sampled and according to the method of Gilman et al., it was examined whether the solution contained unreacted n-butyl magnesium chloride. As a result it was found that no n-butyl magnesium chloride was present in the solution.

Then, 50 ml of the resulting solution (the magnesium content being 35 millimoles) was taken and diluted with 100 ml of toluene. The diluted solution was heated at 80°C. and about one-half of the liquid phase was thus distilled off. Then, the excessive tetrahydrofuran was removed, and the resulting viscous solution was diluted again with 100 ml of toluene.

As a result of the analysis of the so obtained solution of the reaction product, it was found that tetrahydrofuran was contained in an amount of 0.42 mole per mole of magnesium.

b. Preparation of Solid Catalyst Component (A)

The so obtained solution of the reaction product (a) of α,ω-dihydroxydimethyl and n-butyl magnesium chloride was transferred into a flask placed in an inert atmosphere. Then, 38 ml of titanium tetrachloride was added dropwise to the solution under agitation at room temperature over a period of 1 hour. During this dropwise addition the temperature was maintained below 30°C. Then, the mixture was heated at 90°C. for 1 hour. After completion of the reaction, the resulting solid phase was separated and washed with n-hexane until the presence of the chlorine ion was not detected in the washing liquor. Thus was obtained 200 ml of a slurry of a solid catalyst component (A) suspended in n-hexane (the concentration of the solid catalyst component (A) being 22 mg/ml). As a result of the analysis of the so obtained solid catalyst component (A), it was found that 45.2 mg of the titanium atom was contained per g of the solid catalyst component.

c. Polymerization of Ethylene

A 1.2 liter capacity stainless steel autoclave, the inside atmosphere of which had been replaced by nitrogen, was charged with 600 ml of n-hexane, and 495 mg of tri-isobutyl aluminum and the above slurry of the solid catalyst component (A) in an amount of 5 mg as the solid catalyst component (A) were added successively to the charge of the autoclave. Then, hydrogen was introduced under a pressure of 2 Kg/cm$^2$ and the temperature was elevated to 85°C. Then, ethylene was continuously introduced so that the total pressure was 9 Kg/cm$^2$. In this state polymerization was conducted for 1 hour. The resulting polymer was separated from the solvent and dried to obtain 176 g of white powdery polyethylene having a density of 0.9603. This polyethylene was characterized by MI$_2$ of 2.0 g/10 min, number of the methyl group and unsaturated double bond of 2.2 and 0.10, respectively, per 1000 carbon atoms. The Ti content in the polyethylene was 1.4 ppm as measured according to the fluorescent X-ray method. The activity of the catalyst corresponded to 775 Kg PE/g of Ti/hr and 35.1 Kg PE/g of catalyst/hr.

EXAMPLE 14 c. Polymerization of Ethylene

Polymerization was carried out under the same conditions as in (c) of Example 13 except that 285 mg of triethyl aluminum was used as the organoaluminum component and the amount of the solid catalyst component (A) obtained in (b) of Example 13 was changed to 10 mg. 138 g of polyethylene having MI$_2$ of 11.3 g/10 min was obtained. The activity of the catalyst corresponded to 305 Kg PE/g of Ti/hr and 13.8 Kg PE/g of catalyst/hr.

EXAMPLE 15 a. Preparation of Reaction Product

The use of the same reaction vessel as used in (a) of Example 13, α,ω-dihydroxydimethylpolysiloxane was reacted with n-butyl magnesium chloride in the following manner.

40 ml of the same α,ω-dihydroxydimethylpolysiloxane of a degree of polymerization of 9 as used in (a) of Example 13 (the SiOH content being 109 millimoles) was diluted with 100 ml of n-hexane, and 36 ml of a tetrahydrofuran solution containing 109 millimoles of n-butyl magnesium chloride was added little by little to the above diluted solution at room temperature. After completion of the addition, the mixture was agitated at 50°C. for 1 hour to obtain a slurry of a finely divided, white precipitate. When a part of the slurry was sampled and tested according to the above-mentioned method of Gilman et al., it was found that no n-butyl magnesium chloride was present. Then, the slurry was subjected to degasification under reduced pressure to remove the solvent from the slurry. Then, n-heptane was added to the residue to form 250 ml of a slurry.

b. Preparation of Solid Catalyst Component 50 ml of titanium tetrachloride was added dropwise to 70 ml of the above reaction product slurry (a) (the magnesium content being 30.5 millimoles) over a period of 30 minutes at a temperature approximating room temperature, and the reaction was conducted at 110°C. for 30 minutes. Immediately after completion of the reaction, the solid phase was separated and washed with n-hexane until the presence of the chlorine ion was not detected in the washing liquor. Then, the solid was heated and dried under reduced pressure. As a result of the analysis of the so obtained powdery solid catalyst component, it was found that titanium was contained in an amount of 41.4 mg per g of the solid catalyst component.

c. Polymerization of Ethylene

Polymerization was carried out under the same conditions as in (c) of Example 13 except that 10 mg of the above solid catalyst component was employed and hydrogen was introduced under a pressure of 3 Kg/cm². 144 g of polyethylene having $MI_2$ of 4.1 g/10 min was obtained. The activity of the catalyst corresponded to 348 Kg PE/g of Ti/hr and 14.4 Kg PE/g of catalyst/hr.

EXAMPLE 16 b. Preparation of Solid Catalyst Component 90 millimoles of titanium tetrachloride was added little by little to 45 millimoles of tetra-n-butoxy titanium diluted with 50 ml of n-heptane at a temperature lower than room temperature. Then, 70 ml of the reaction product slurry prepared in (a) of Example 15 was added to the mixture, and the resulting mixture was heated at 110°C. for 30 minutes. The resulting reaction product was treated in the same manner as in (b) of Example 15 to obtain a white, powdery solid catalyst component (A), in which titanium was contained in an amount of 56.0 mg per g of the solid catalyst component.

c. Polymerization of Ethylene

Polymerization was carried out under the same conditions as in (c) of Example 13 except that 10 mg of the above solid catalyst component was employed and hydrogen was introduced under a pressure of 3 Kg/cm². 156 g of polyethylene having $MI_2$ of 4.5 g/10 min was obtained. The activity of the catalyst corresponded to 279 Kg PE/g of Ti/hr and 15.6 Kg PE/g of catalyst/hr.

EXAMPLE 17 a. Preparation of Reaction Product 40 ml of a tetrahydrofuran solution containing 124 millimoles of n-butyl magnesium chloride was added little by little dropwise to 14 ml (126 millimoles) of trimethylhydroxysilane at a temperature maintained below 30°C. After completion of the dropwise addition, the mixture was agitated for 30 minutes. Then, the resulting reaction mixture was subjected to degasification under reduced pressure to remove the solvent, and the resulting reaction product was dried. The resulting solid was used in the form of a solution in 150 ml of toluene for formation of a solid catalyst component. As a result of the analysis of the solid, it was found that tetrahydrofuran was contained in an amount of 0.86 mole per mole of magnesium.

b. Preparation of Solid Catalyst Component 70 ml of the above toluene solution of the reaction product was taken (the magnesium content being 42 millimoles) and 50 ml of titanium tetrachloride was added dropwise to the solution while maintained the inside temperature of the reaction vessel below 30°C. Then, the reaction was conducted at 100°C. for 90 minutes. The reaction product was treated in the same manner as in (b) of Example 13 to obtain a slurry of a solid catalyst component (A) in n-hexane. The amount of the so formed solid catalyst component was 4.7 g and it was found that titanium was contained in an amount of 57.7 mg per g of the solid catalyst component.

c. Polymerization of Ethylene

With use of the so obtained solid catalyst component, polymerization was carried out under the same conditions as in (c) of Example 13 except that the hydrogen pressure was changed to 3 Kg/cm². 166 g of polyethylene having $MI_2$ of 2.5 g/10 min was obtained. The activity of the catalyst corresponded to 575 Kg PE/g of Ti/hr and 33.2 Kg PE/g of catalyst/hr.

EXAMPLE 18 a. Preparation of Reaction Product 32 ml of a tetrahydrofuran solution containing 99 millimoles of n-butyl magnesium chloride was added little by little dropwise to 24 g of methyldiphenylhydroxysilane diluted with 50 ml of toluene while maintaining the temperature below 30°C. After completion of the dropwise addition, the mixture was agitated for 1 hour. A part of the resulting semi-transparent solution was sampled and tested according to the method of Gilman et al. As a result it was found that no unreacted n-butyl magnesium chloride was present in the solution. Then, the solution was subjected to degasification under reduced pressure to remove the solvent, and the residual solid was dissolved in 100 ml of toluene again. The resulting toluene solution was employed for formation of a solid catalyst component.

b. Preparation of Solid Catalyst Component 50 ml of the above toluene solution of the reaction product (the magnesium content being 42 millimoles) was taken, and 30 ml of titanium tetrachloride was added dropwise to the above solution while maintaining the temperature below 30°C. Then, the reaction was conducted at 100°C. for 1 hour, and the resulting reaction product was treated in the same manner as in (b) of Example 13 to obtain a slurry of a solid catalyst component in n-hexane, in which titanium was contained in an amount of 61.0 mg per g of the solid catalyst component.

c. Polymerization of Ethylene

With use of the so obtained solid catalyst component, polymerization was carried out under the same conditions as in (c) of Example 13 except that the hydrogen pressure was changed to 3 Kg/cm². 154 g of polyethylene having $MI_2$ of 3.1 g/10 min was obtained. The activity of the catalyst corresponded to 505 Kg PE/g of Ti/hr and 30.8 Kg PE/g of catalyst/hr.

EXAMPLE 19 a. Preparation of Reaction Product

Reaction was conducted between a hydroxyl group-containing silicone, Z-6018 manufactured by Dow Corning Co. (powdery product having an average molecular weight of 1600 and a total hydroxyl group content of 6.0% by weight) and n-butyl magnesium chloride in the following manner.

The above silicone was dried under reduced pressure at 50°C. for 1 hour, and 20 g of the dried silicone was dissolved in 100 ml of toluene. 25 ml of a tetrahydrofuran solution containing 71 millimoles of n-butyl magnesium chloride was added to the solution while maintaining the temperature below 30°C. After completion of the dropwise addition, the mixture was agitated for 30 minutes. A part of the resulting semi-transparent liquor was taken and tested according to the method of Gilman et al. to examiner whether or not n-butyl magnesium chloride was contained in the liquor. As a result, the presence of n-butyl magnesium chloride was not observed. Then, this semi-transparent liquor was subjected to degasification under reduced pressure to remove the solvent. The residual reaction product was dried and the resulting solid was dissolved in 200 ml of toluene again. As a result of the analysis of this solid, it was found that tetrahydrofuran was contained in an amount of 1 mole per mole of magnesium.

b. Preparation of Solid Catalyst Component 120 ml of the above solution of the reaction product (the magnesium content being 36 millimoles) was taken, and 50 ml of titanium tetrachloride was added dropwise to the toluene solution at room temperature. After completion of the dropwise addition, the temperature was elevated to 100°C. and at this temperature the reaction was conducted for 1 hour. The resulting reaction product was treated in the same manner as in (b) of Example 13 to obtain a slurry of a solid reaction product (A) in n-hexane. As a result of the analysis of this solid catalyst component, it was found that titanium was contained in an amount of 57.2 mg per g of the solid catalyst component.

c. Polymerization of Ethylene

With use of 6 mg of the so obtained solid catalyst component, polymerization was carried out under the same conditions as in (c) of Example 13 except that the hydrogen pressure was changed to 3 Kg/cm$^2$. 137 g of polyethylene having MI$_2$ of 2.0 g/10 min was obtained. The activity of the catalyst corresponded to 398 Kg PE/g of Ti/hr and 22.8 Kg PE/g of catalyst/hr.

EXAMPLE 20 c. Polymerization of Ethylene

Polymerization of ethylene was carried out under the same conditions as in (c) of Example 13 except that 12 mg of the solid catalyst component obtained in (b) of Example 19 was employed, 285 mg of triethyl aluminum was used as the organoaluminum component and the hydrogen pressure was changed to 3 Kg/cm$^2$. 136 g of polyethylene having MI$_2$ of 2.8 g/10 min was obtained. The activity of the catalyst corresponded to 198 Kg PE/g of Ti/hr and 11.3 Kg Pe/g of catalyst/hr.

EXAMPLE 21 a. Preparation of Reaction Product

A flask equipped with a thermometer and a condenser was dried and the inside atmosphere was replaced by nitrogen. Then, 13.0 g (60.1 millimoles) of dried diphenyldihydroxy silane and 25 ml of toluene were thrown in the flask, and a dropping funnel filled with 70 ml (121 millimoles) of butyl magnesium chloride (BuMgCl), synthesized in a toluene/tetrahydrofuran mixed solvent (the mole ratio being 4/1) was set to the flask. At room temperature, butyl magnesium chloride was added little by little to the content of the flask at room temperature under agitation. Upon initiation of the dropwise addition, generation of bubbles was observed. The addition of all of butyl magnesium chloride was completed in about 30 minutes. As a result there was obtained a transpatent solution. Then, this transparent solution was heated at 70° to 80°C. for 1 hour.

Then, the solution was subjected to degasification under reduced pressure to evaporize and remove the solvent, and the residue was dried at 60°C. under reduced pressure. The resulting waxy substance was pulverized in a nitrogen atmosphere to obtain a powdery solid reaction product (a).

b. Preparation of Solid Catalyst Component

A flask equipped with a thermometer and a condenser was dried and the inside atmosphere was replaced by nitrogen. Then, 8.6 g of the above reaction product (a) and 50 ml of titanium tetrachloride were charged into the flask, and the reaction was conducted for 30 minutes at an elevated temperature of 110°C. Immediately after termination of the reaction, the solid phase was separated and washed with n-hexane until the presence of the chlorine ion was not detected in the washing liquor. The solid was then dried sufficiently under reduced pressure. As a result of the analysis of the so obtained powdery solid catalyst component it was found that titanium was contained in an amount of 57.3 mg per g of the solid catalyst component.

c. Polymerization of Ethylene

A 1.2 liter capacity stainless steel autoclave, the inside atmosphere of which had been replaced by nitrogen, was charged with 600 ml of n-hexane, and 495 mg of tri-isobutyl aluminum and 4.7 mg of the above solid catalyst component were added in n-hexane successively.

Then, hydrogen was introduced under a pressure of 3 Kg/cm$^2$ and the temperature was elevated to 85°C. Polymerization was conducted for 1 hour by introducing ethylene continuously so that the total pressure was 9 Kg/cm$^2$. The solvent was directly separated from the resulting polymer, and the residue was dried to obtain 112 g of white powdery polyethylene.

This polyethylene was characterized by MI$_2$ of 2.0 g/10 min and a bulk density of 0.274 g/cm$^3$. The activity of the catalyst corresponded to 415 Kg PE/g of Ti/hr and 23.6 Kg PE/g of catalyst/hr.

EXAMPLE 22 a. Preparation of Reaction Product

With use of the same reaction vessel as used in Example 13, the preparation of a reaction product of $\alpha,\omega$-dihydroxydimethylpolysiloxane and n-butyl magnesium chloride was carried out in the following manner.

20 ml of $\alpha,\omega$-dihydroxydimethylpolysiloxane having an average degree of polymerization of 12 (the SiOH content being 43 millimoles) and 40 ml of toluene were charged into the flask. 17.2 ml (43 millimoles) of n-butyl magnesium chloride synthesized in tetrahydrofuran was added little by little dropwise from the dropping funnel to the charge of the flask at room temperature under agitation over a period of 20 minutes. Then, the temperature was elevated to 60°C. and at this temperature the reaction was conducted for 1 hour to obtain a faintly brown, homogeneous solution. A part of this solution was sampled and tested according to the method of Gilman et al. It was found that the solution did not contain unreacted n-butyl magnesium chloride.

The so obtained solution was diluted with 200 ml of toluene, and the diluted solution was heated at 80 to 100°C. About 70% of the liquid phase was distilled off under reduced pressure at this elevated temperature.

The resulting viscous solution was diluted with toluene to obtain 200 ml of a toluene solution of a reaction product.

b. Preparation of Solid Catalyst Component 53 ml of the above toluene solution of the reaction product (the Mg content being 11.4 millimoles) was transferred into a flask in an inert gas atmosphere, and 10.8 ml of vanadium oxychloride ($VOCl_3$) was added dropwise to the above solution over a period of about 20 minutes under agitation. During the dropwise addition, the temperature was maintained at 30°C. The resulting mixture was heated at 60°C. for 1 hour to effect the reaction. After termination of the reaction, the resulting solid phase was immediately separated and washed with n-hexane until the presence of the chlorine ion was not detected in the washing liquor.

The resulting solid was dried at 50°C. under reduced pressure to obtain 1.1 g of a blackish green solid catalyst component.

c. Polymerization of Ethylene

Polymerization was carried out under the same conditions as in (c) of Example 13 except that 41 mg of the so obtained solid was used as the solid catalyst component, 100 mg of diethyl aluminum monochloride was used as the organoaluminum component and hydrogen was introduced under a pressure of 1 Kg/cm². 98 g of white powdery polyethylene having $MI_2$ of 0.74 g/10 min was obtained. The activity of the catalyst corresponded to 2.4 Kg PE/g of catalyst/hr.

We claim:

1. A catalyst for polymerization of olefins which comprises an organic metal compound and a solid catalyst component obtained by reacting a transition metal halogen compound with a reaction product between an organic silicon compound selected from the group consisting of chain hydropolysiloxanes, cyclic hydropolysiloxanes and organic and hydroxyl groups bearing organic silicon compounds and a Grignard reagent.

2. A catalyst for polymerization of olefins according to claim 1, wherein the hydropolysiloxane to be reacted with a Grignard reagent is selected from chain or cyclic hydropolysiloxanes having the structural units expressed by the general formula:

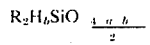

wherein R is a member selectd from the group consisting of alkyl, aryl, aralkyl, alkoxy and aryloxy groups, $a$ is 0, 1 or 2 and $b$ is 1, 2 or 3 with the proviso that the sum of $a$ and $b$ does not exceed 3.

3. A catalyst for polymerization of olefin according to claim 2, the hydropolysiloxane to be reacted with a Grignard reagent is a member from tetramethyl disiloxane, dipheyldisiloxane, trimethylcyclotrisiloxane, tetramethylcyclotetrasiloxane, methylhydropolysiloxane, phenylhydroxypolysiloxane, ethoxyhydropolysiloxane and chlorophenylhydropolysiloxane.

4. A catalyst for polymerization of olefins according to claim 1, wherein the organic and hydroxy groups bearing organic silicon compound to be reacted with a Grignard reagent is a silane type compound having the formula:

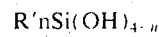

wherein R' is a monovalent straight or branched hydrocarbon residue having 1 to 18 carbon atoms and $n$ is an integer of 1, 2 or 3.

5. A catalyst for polymerization of olefins according to claim 4, wherein the silane type compound is a member from trimethylhydroxysilane, triethylhydroxysilane, triphenylhydroxysilane, methyldiphenylhydroxysilane, diethyldihydroxysilane, dipropyl dihydroxy silane, diallyldihydroxysilane, dicyclohexyldihydroxysilane, diphenyldihydroxysilane, butyltrihydroxysilane and phenyltrihydroxysilane.

6. A catalyst for polymerization of olefins according to claim 1, wherein the organic and hydroxyl groups bearing organic silicon compound is a member from straight, branched and cross linked polysiloxane compounds which are a condensate of silane type compounds of the formula:

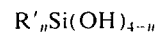

wherein R' and $n$ are the same as defined above and having the siloxane linkage (Si—O—Si) in the molecule.

7. A catalyst for polymerization of olefins according to claim 6, wherein the polysiloxane type compound is a member from $\alpha,\omega$-dihydroxydimethylpolysiloxanes, $\alpha,\omega$-dihydroxy diphenylpolysiloxanes and $\alpha,\omega$-dihydroxy methyl phenyl polysiloxane.

8. A catalyst for polymerization of olefins according to claim 1, wherein the Grignard reagent is an organic magnesium compound obtained by reacting an organic halide with metallic magnesium or a magnesium alloy.

9. A catalyst for polymerization of olefins according to claim 1, wherein the transition metal halogen compound is a member selected from the group consisting of titanium halogen compounds and vanadium halogen compounds.

10. A catalyst for polymerization of olefins according to claim 1, wherein the organic metal compound is a member selected from the group consisting of organoauminum compounds and organozinc compounds.

11. A catalyst for polymerization of olefins according to claim 1, wherein the hydropolysiloxane is reacted with a Grignard reagent at a MgR:Si mole ratio of from 0.05:1 to 1:1 in a solvent at a temperature of 20° to 100°C. to form a reaction product and the reaction product is reacted with a transition metal halogen compound in the presence of a solvent to make a solid catalyst component.

12. A catalyst for polymerization of olefins according to claim 1, wherein the silane type compound is reacted with a Grignard reagent at a MgR SiOH mole ratio of 0.05–1:1 in a solvent at a temperature of −50° to 100°C. to form a reaction product, and the reaction product is reacted with a transition metal halogen compound in the presence of a solvent to make a solid catalyst component.

13. A process for polymerization of olefins which comprises forming a polymerization catalyst system by mixing an organic metal compound with a solid reaction product composed of an organic silicon compound, a Grignard reagent and a transition metal halogen compound in a solvent, introducing an olefin in said polymerization catalyst system and polymerizing the olefin under atmospheric or elevated pressure at a temperature ranging from room temperature to 200°C.

14. A process according to claim 13, wherein the olefin monomer to be polymerized is ethylene.

15. A process according to claim 13, wherein ethylene is copolymerized with up to 10% of an α-olefin selected from the group consisting of propylene, butene-1 and hexene-1.

* * * * *